(12) United States Patent
Babinsky et al.

(10) Patent No.: US 8,652,598 B2
(45) Date of Patent: *Feb. 18, 2014

(54) PACKAGING MATERIALS WITH ENHANCED THERMAL-INSULATING PERFORMANCE

(71) Applicant: MeadWestvaco Corporation, Richmond, VA (US)

(72) Inventors: Vladislav Babinsky, Midlothian, VA (US); Sven S. Arenander, Richmond, VA (US); Dobridge C. Newman, Glen Allen, VA (US); Bruce W. Babcock, Charleston, SC (US); David H. Hawes, Raleigh, NC (US)

(73) Assignee: MeadWestvaco Corporation, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,071

(22) Filed: Aug. 2, 2013

(65) Prior Publication Data

US 2013/0344304 A1 Dec. 26, 2013

Related U.S. Application Data

(63) Continuation of application No. 13/080,064, filed on Apr. 5, 2011, now Pat. No. 8,541,074, which is a continuation of application No. PCT/US2010/033653, filed on May 5, 2010.

(60) Provisional application No. 61/175,569, filed on May 5, 2009, provisional application No. 61/287,990, filed on Dec. 18, 2009.

(51) Int. Cl.
| | |
|---|---|
| *B29D 22/00* | (2006.01) |
| *B29D 23/00* | (2006.01) |
| *B32B 1/08* | (2006.01) |
| *B32B 27/10* | (2006.01) |

(52) U.S. Cl.
USPC ...... 428/34.2; 428/34.1; 428/35.7; 428/36.91

(58) Field of Classification Search
USPC ............................ 428/34.1, 34.2, 35.7, 36.91
See application file for complete search history.

(56) References Cited

U.S. PATENT DOCUMENTS

2007/0117927 A1  5/2007  Han et al.

*Primary Examiner* — Michael C Miggins
(74) *Attorney, Agent, or Firm* — MeadWestvaco Intellectual Property Group

(57) ABSTRACT

A thermo-insulating packaging material including a paper-based substrate layer, a paper-based top layer and a thermal-insulating composition positioned between the paper-based substrate layer and the paper-based top layer, the thermal-insulating composition including a filler, an organic binder and a plasticizer.

20 Claims, 4 Drawing Sheets

C

PACKAGING MATERIALS WITH ENHANCED THERMAL-INSULATING PERFORMANCE

PRIORITY

This application is a continuation of U.S. Ser. No. 13/080,064 filed on Apr. 5, 2011 (pending), which is a continuation of PCT/US2010/033653 (national phase) filed on May 5, 2010, which claims priority from U.S. Ser. No. 61/175,569 (expired) filed on May 5, 2009 and U.S. Ser. No. 61/287,990 filed on Dec. 18, 2009. The entire contents of all four priority applications are incorporated herein by reference.

FIELD

This application relates to packaging materials and, more particularly, to thermal-insulating packaging materials, such as cups and containers.

BACKGROUND

Paperboard is a low-cost material that is ubiquitous in the field of packaging generally. Its strength and thermal insulation properties are however limited, and laminates with other materials have been developed and are widely used. For example, U.S. Pat. Nos. 7,192,640 and 5,091,261 disclose paperboard/polymer laminates for forming blister packs. These patents do not disclose the use of such laminates for making paper cups or other food or beverage containers. U.S. Pat. No. 6,811,843 describes a cup formed from a laminate including an insulating layer and a paper stock layer. The insulating layer is heat-laminated foam formed from high density polyethylene, low density polyethylene, linear low density polyethylene, or oriented polypropylene. U.S. Pat. No. 6,277,454 discloses a single-walled container for storing hot or cold liquids, comprising an inner layer of paperboard laminated to an outer layer of syntactic foam. Void-containing particles in the foam improve the thermal insulation. The syntactic foam outer layer contains void structure and a regular pattern, such as stripes or dots, to improve the thermal insulation.

A single-walled container is known for its limitation of strength, and its vulnerability to damage of the exposed pattern of foam. Since such containers are intended to hold scalding hot liquids, these disadvantages can give rise to product liability issues. A double-walled laminate container is sturdier, but the doubled laminated structure has poor flexibility. Therefore, it is relatively difficult in forming the doubled laminated structure into a container shape using the standard cup-making machines.

Additionally, there has been increased environmental concern for biodegradability and recycling of packaging materials. Synthetic foams and thermosetting plastics are neither biodegradable nor recyclable, and in many cases they produce toxic breakdown products when incinerated. Therefore, the known thermally insulating packaging materials and containers made of paperboard/polymer laminates presents environmental concerns.

Accordingly, there is a need for the biodegradable packaging material with enhanced thermal-insulating performance and strength that allows for its production using the existing papermaking process and for its formation into the packaging containers using the existing converting process, such that an improved cost per package may be achieved and the packaging containers may be formed, filled and sealed at economically high speeds using conventional packaging machine temperatures, pressures and dwell times.

SUMMARY

A packaging material with enhanced thermal-insulating performance is disclosed that includes a paper-based substrate and a thermal-insulating layer positioned on at least one surface of the substrate. The thermal-insulating layer contains void structure and is derived from a fluid thermal-insulating composition comprising: 20% to 70% weight of filler; 15% to 70% weight of organic binder; 0.5% to 10 weight of plasticizer; and 10% to 15% weight of moisture, based on the total thermo-insulating composition weight. When desired, the disclosed packaging material may further include a paper-based top layer such that the thermal-insulating layer is positioned between the paper-based substrate and the paper-based top layer. The disclosed packaging material may be used in the formation of thermo-insulating containers such as food bowls and beverage cups, as well as the sleeve components to impart thermo-insulating performance to packaging containers.

DETAILED DESCRIPTION

Figure 1:
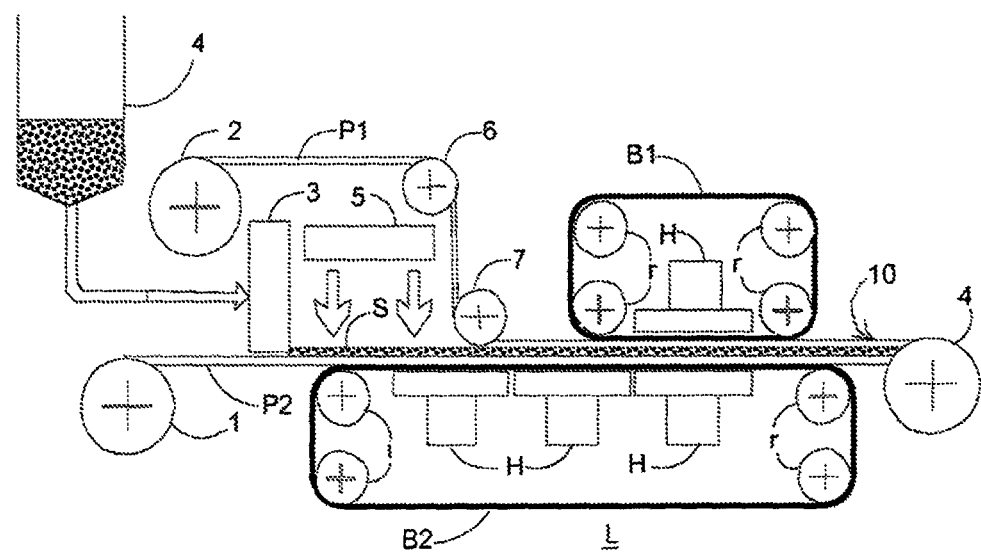
FIG. 1 shows one embodiment of the disclosed production process of the packaging materials with enhanced thermal-insulating performance.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof.

The packaging material of the present disclosure includes:
  (A) a paper-based substrate; and
  (B) a thermal-insulating layer positioned on at least one surface of the substrate, the thermal-insulating layer containing void structure and being derived from a fluid thermal-insulating composition comprising based on total weight of the composition:
    (a) filler in an amount of 20% to 70% weight;
    (b) organic binder in an amount of 15% to 70% weight;
    (c) plasticizer in an amount of 0.5% to 10 weight; and
    (d) moisture in an amount of 10% to 15% weight.

In one embodiment of the present disclosure, the filler used in the fluid thermal-insulating composition comprises, based on total weight of the filler:
(i) inorganic filler in an amount of 0% to 90% weight; and
(ii) organic filler in an amount of 10% to 100% weight.

In one embodiment of the present disclosure, the filler used in the fluid thermal-insulating composition comprises, based on total weight of the filler:
(i) inorganic filler in an amount of 40% to 90% weight; and
(ii) organic filler in an amount of 10% to 60% weight.

The disclosed packaging material may be produced by a process including steps of:
(I) providing a paper-based substrate having a first and a second surfaces;
(II) applying a thermal-insulating layer onto the first surface of the paper-based substrate to provide a coated structure, the thermally insulating layer containing void structure and being derived from the aforementioned fluid thermal-insulating composition; and
(III) drying the coated structure to reduce a water content of the thermal-insulating layer to a range of 10% to 15% weight, based on total weight of the thermal-insulating layer.

In one embodiment, the disclosed process of producing the present thermal-insulating packaging material may further include a step of applying a paper-based top layer onto the dried, coated structure of step (III) such that the thermal-insulating layer is positioned between the paper-based substrate and the paper-based top layer. For this embodiment, the disclosed thermal-insulating packaging material includes:
(A) a paper-based substrate having a first and a second surfaces;
(B) a paper-based top layer; and
(C) a thermal-insulating layer positioned between the first surface of the paper-based substrate and the paper-based top layer, wherein the thermal-insulating layer contains void structure and is derived from the aforementioned thermal-insulating composition.

When desired, the process of producing the present thermal-insulating packaging material may further include a step of applying a moisture barrier composition to the other surface of the paper-based substrate that is opposite to the surface coated with the thermal-insulating layer. For this embodiment, the disclosed thermal-insulating packaging material includes:
(A) a paper-based substrate having a first and a second surfaces;
(B) a paper-based top layer;
(C) a thermal-insulating layer positioned between the first surface of the paper-based substrate and the paper-based top layer, wherein the thermal-insulating layer contains void structure and is derived from the aforementioned thermal-insulating composition; and
(D) a moisture barrier layer positioned on the second surface of the paper-based substrate.

In one embodiment, the thermal-insulating layer may be placed between the paper-based substrate and the paper-based top layer to provide a sandwich structure such that the thickness of the final assembly structure is 20% to 100% greater than the combined thickness of the paper-based substrate and the paper-based top layer. In this embodiment, the thermal-insulating layer acts as a spacer and provides for separation of the two paper-based layers. It is believed that the disclosed thermal-insulating layer is able to provide this spacing property due to its fluid pseudoplastic characteristics combined with its unique component properties.

Several application techniques may be used to deposit the thermal-insulating composition onto the paper-based substrate. Examples include, but are not limited to, rod coating, blade coating, curtain coating, spray coating, and extrusion.

The thermal-insulating composition may be applied onto the paper-based substrate in a form of coalesced droplets, longitudinally-extending sinuous strands, or combinations thereof. When the thermal-insulating composition is applied in a form of strands, the strands may have a thickness range of 0.05 mm to 0.5 mm.

In one embodiment, the thermal-insulating composition may be applied onto the paper-based substrate using a standard spray deposition apparatus that is low cost and resistant to mechanical damage.

In one embodiment, the thermal-insulating composition may be applied onto the paper-based substrate in a form of foam incorporating an emulsion polymer binder. Additionally, the foam may comprise mechanically whipped latex.

In one embodiment, the fluid thermal-insulating composition has a pseudoplasticity index in a range 0.3 to 0.5.

In one embodiment, the fluid thermal-insulating composition may have a low shear viscosity in a range of 2,000 to 50,000 centipoises and a high shear viscosity in a range of 100 to 5,000 centipoises.

In one embodiment, the thermal-insulating layer of the present disclosure may be tailored to hold pressures in the range of 0.1 kgf/cm$^2$ to 1.0 kgf/cm$^2$ (10 Kpa to 100 Kpa).

In one embodiment, the thermal-insulating layer may be applied on the surface of the paper-based substrate, such as via spraying application, to create a textured surface. Two-ply paperboard may be used as paper-based substrate, paper-based top layer, or both.

The thermal-insulating composition may be selectively applied onto the surface of paper-based substrate such that the resulting thermal-insulating layer may be selectively patterned and imparted onto the paper-based substrate. For example, the thermal-insulating layer may be selectively applied such that the container formed from the disclosed thermal-insulating packaging material has enhanced thermal-insulating performance at the selected portion. Accordingly, the need for a secondary thermal insulator to be wrapped around the container may be eliminated. This aspect of the disclosure is particularly useful when the disclosed thermal-insulating packaging material is used for hot beverage applications.

A variety of drying techniques may be used in the drying step (III) of the disclose method. Examples of such drying techniques include, but are not limited, to heated air, hot plates, infrared heating, and combinations thereof. When appropriate, the thermal-insulating composition may include a humectant to assist in maintaining the moisture content at the selected level.

In one embodiment of the present disclosure, the thermal-insulating packaging material may be used for the formation of single-layer cups.

In one embodiment of the present disclosure, the thermal-insulating packaging material may be used for the formation of two-layer cups. The disclosed thermal-insulating packaging material may be applied in a two-layer cup machine as a second layer on a cup made from conventional paperboard substrate. Several commercially available cup machines may be used. Examples are the cup machines from Paper Machinery Corporation of Wisconsin, USA; Hörauf America, LLC of Pennsylvania, USA; and those disclosed in U.S. Pat. No. 5,324,249.

FIG. 1 shows one embodiment of the disclosed production process. Upper and lower feed rolls 1 and 2 supply upper and lower paper-based webs P1 and P2 to a flatbed laminating machine (such as the Glenro model HPH machine available from Glenro Inc., New Jersey, USA) and thence to a take-up roll 4. The fluid thermal-insulating composition is stored in controlled hopper 4, fed to the applicator 3, and then applied onto a surface of the paper-based substrate web P2. For example, the applicator 3 may be a fiber spray applicator such as a UFD High Speed—Auto Adhesive Applicator available from ITW Dynatech, Tennessee, USA. The applied substrate web P2 is then dried, such as by the means of infrared heater 5, to provide a web of paper-based substrate P2 with a thermally insulating layer S on its surface. The coated paper-based substrate is then combined with the paper-based top layer web P1 that is guided over guide rolls 6 and 7. The resulting assembly is subjected to the nip of guide roll 7 and an underlying conveyor belt B2 of the laminator L. Downstream of guide roll 7, compression of the resulting laminate is maintained by an upper conveyor belt B1 of the laminator which opposes the upper run of conveyor belt B2. Both these conveyor belts run on guide rolls r and apply heat and pressure from electric heating plates H. The thermal-insulating layer S may be controllably dried to a moisture content of 10% to 15% weight of the total layer weight. Finally, the resulting thermal-insulating laminate 10 is received by take-up roll 4. When desired, the porosity of the paper-based substrate, such as paperboard, may be selected to be in the range of 20 to 150 Gurley units to provide a path for steam to escape during the drying process in the laminator L.

In one embodiment, the thermal-insulating composition may be formulated such that it has strong pseudoplastic characteristics with a low shear Brookfield viscosity of 2,000 to 50,000 cps to hold the gap between the paper-based webs P1 and P2.

In one embodiment, the thermal-insulating composition may have a viscosity of greater than 10,000 cps.

Example of the organic binders suitable for use in the disclosed thermal-insulating composition may include, but are not limited to, styrene-butadiene polymer, an acrylic-styrene butadiene-latex binder, starch, polyvinyl alcohol, polyvinyl acetate, and combinations thereof. In one embodiment, the binder may include a Stein Hall reaction mixture, namely a mixture of sodium hydroxide solution, raw pearl (i.e., ungelatinized) starch and borax. Upon heating in the laminator L as shown in FIG. 1, the starch gelatinizes and absorbs water, and subsequently creates a rapid green bond between the paper-based webs P1 and P2. Furthermore, the remaining unreacted raw starch particles may act as mechanical spacers keeping the paper-based webs apart.

In one embodiment, the thermal-insulating composition comprises no more than 20% weight of starch binder based on total composition weight. In one embodiment, the starch binder may include 10% to 50% by weight of gelatinized starch and 50% to 90% by weight of ungelatinized starch. In other embodiment, the starch binder may include 0% to 70% by weight of gelatinized starch and 30% to 100% by weight of ungelatinized starch. In other embodiment, the starch binder may include 50% to 100% by weight of gelatinized starch and 0% to 50% by weight of ungelatinized starch.

In yet another embodiment, the thermal-insulating composition comprises more than 20% weight of starch binder based on total composition weight, wherein the starch binder may include 10% to 50% by weight of gelatinized starch and 50% to 90% by weight of ungelatinized starch.

Suitable fillers for use in the disclosed thermal-insulating composition may include organic filler, inorganic filler, or combinations thereof. Examples of such fillers include, but are not limited to, cellulosic fibers, wood flour, pearl starch, calcium carbonate, sawdust, gypsum, plaster, clay, corn seed skin, gluten feed, and combinations thereof. Gluten feed is a corn byproduct that may impart the disclosed thermal-insulating packaging material with enhanced tear resistance, compression and edge strength.

In one embodiment, the thermal-insulating composition may include cellulosic fibers, wood flour, or combinations thereof, in an amount of 2% to 10% weight based on the total composition weight to impart an enhanced tear resistance to the final packaging material.

In one embodiment, the thermal-insulating composition may include cellulosic fibers as organic filler in a range of 2% to less than 50% by weight based on the total composition weight. In one embodiment, the cellulosic solids may have a particle size of more than 100 microns. Examples of suitable cellulosic solids include, but are not limited to, cellulosic fibers, wood flour, wood dust, gluten feed, and combinations thereof. When desired, the cellulosic fibers may have a length of no greater than 2 mm and an aspect ratio of no greater than 25:1.

In one embodiment, the thermal-insulating composition may include corn fibers in the range of 0.5% to less than 1% by weight based on the total composition weight.

In one embodiment, the filler component of the thermal-insulating composition may comprise insulating particles selected from the group consisting of ceramic air-containing particles, pearlite particles, and combinations thereof.

In one embodiment, the thermal-insulating composition may include mechanically-induced foam comprising an emulsion polymer binder and a foam stabilizer. Examples of suitable emulsion polymer binders include, but are not limited to, styrene-butadiene latex, acrylic-SRB-latex, starch, and combinations thereof. Additionally, mechanically whipped latex may be used as the foam component in the disclosed thermal-insulating composition. To reduce the cost, the thermal-insulating composition may further include filler materials. Examples of suitable fillers include, but are not limited to, cellulosic insulation such as those available from Cell-Pak LLC and Nu-Wool Company, Inc.; wood flour; sawdust cellulose pulp; rayon fiber; synthetic fibers; and combinations thereof. When desired, the binder and fillers may be whipped together.

In one embodiment, the disclosed thermal-insulating composition further includes borax.

In one embodiment, the disclosed thermal-insulating composition may include sodium silicate filler in an amount of 1% to 15% weight based on the total composition weight.

In one embodiment, the disclosed thermal-insulating composition includes ungelatinized starch organic binder and sodium silicate filler.

In one embodiment, the disclosed thermal-insulating composition comprises, based on the total composition weight: ungelatinized starch binder in an amount of 5% to 32% weight and sodium silicate filler in an amount of 1% to 15% weight. Both these materials are natural materials which do not cause environmental problems when disposed of. Importantly, sodium silicate in solution may undergo a dramatic increase in viscosity and hence resilience when the water content is reduced. Ungelatinized starch absorbs water strongly when heated and hence the combination of materials is synergistic, in that they may be deposited easily in aqueous solution (low viscosity) and on heating set to a high-viscosity resilient state in which the thermally insulating material may be passed through a laminating machine without undue compression. In addition to its outstanding adhesive properties, sodium silicate has the advantage of a very strong dependence of viscosity on concentration. Therefore, it behaves synergistically with ungelatinized starch: as the starch is heated in the laminator L, it absorbs water and hence raises the viscosity of the sodium silicate-containing solution very substantially, thereby maintaining the spacing between the upper and lower paperboard webs.

To further improve the thermal insulation properties, the disclosed thermal-insulating layer may include void-containing particles. Examples of suitable void-containing particles include, but are not limited to, pearlite, hollow ceramic particles, kenaf core, and combinations thereof.

TABLE 1 shows examples of the disclosed thermal-insulating compositions that may be applied onto the paper-based substrate web P2 using the fiber spray applicator 3.

TABLE 1

| Material | EXAMPLE NO. (Parts by Weight) | | | | Component |
|---|---|---|---|---|---|
| | No 1 | No 2 | No 3 | No 4 | |
| cellulosic insulation (recycled newsprint) | 2 | 2 | 2 | 2 | FILLER |
| calcium carbonate | 100 | 100 | 100 | 100 | FILLER |
| clay @40% solids | 150 | 150 | 150 | 150 | FILLER |
| latex SBR @40% solids | 75 | 75 | 75 | 75 | BINDER |
| pearl starch | 100 | 10 | 100 | 100 | BINDER |
| PVOH | 0 | 5 | 10 | 10 | BINDER |
| sorbitol | | 5 | — | — | PLASTICIZER |
| Emtal emulsified fatty acids @40% solids | 5 | 5 | — | — | PLASTICIZER |
| glycerine | — | — | 5 | 5 | PLASTICIZER |
| Safoam FPN3 | 1 | 1 | 1 | 1 | FOAMING AGENT |
| sawdust | 3 | 3 | 3 | 3 | FILLER |
| Triton 100 | 0.5 | 0.5 | 0.5 | | SURFACTANT |
| pearlite | — | — | 1 | 3 | FILLER |
| sodium silicate | 2 | 2 | — | — | BINDER |

TABLE 2 shows yet more examples of the thermal-insulating compositions suitable for use in the present disclosure.

TABLE 2

| Components in the Thermally Insulating Composition | % Weight based on total weight of the Composition |
|---|---|
| Cellulosic insulation (recycled newsprint) | 0-5% |
| Calcium carbonate | 5-40% |
| Latex SBR @40% solids | 5-30% |
| Pearl starch | 5-32% |
| PVOH | 5-15% |
| Sorbitol | 5-10% |
| Emtal emulsified fatty acids @40% solids | 5-11% |
| Glycerine | 5-12% |
| Safoam FPN3 | 1-2% |
| Sawdust | 5-20% |
| Triton 100 | 0.1-2% |
| Pearlite | 0-40% |
| Sodium silicate | 0-15% |

In one embodiment, the thermal-insulating layer S may have a substantial thickness, such as in a range of 0.2 mm to 5 mm. To reduce the energy required in drying the thermally insulating layer, the solids content of the thermal-insulating composition may be in a range of 50% to 70% weight based on the total composition weights. To further reduce the drying energy, the first thermal-insulating composition may be deposited as a first layer on paper-based substrate web P1 and then dried to a solids content of 60% to 90%. Then, a layer of the second thermal-insulating composition may be deposited on the first layer, wherein the second thermal-insulating composition may have a solids content of 30% and 50% and may include tackifier. Examples of suitable tackifiers may include, but are not limited to, rosin, rosin ester, acrylics, aliphatic resins, aromatic resins, or combinations thereof. The second layer of the thermal-insulating composition may be relatively thin, with a weight per unit length of 2% to 10% compared to that of the first layer of the thermal-insulating composition.

Figure 2A:
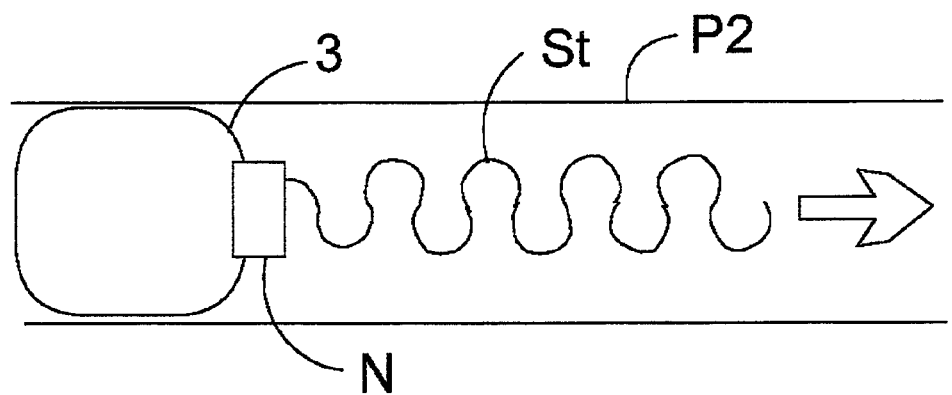
FIG. 2a shows one embodiment of the disclosed production process wherein the thermal-insulating composition is spray-applied onto the paper-based substrate as essentially continuous sinuous strands.

Referring to one embodiment of the disclosed process as shown in FIG. 2a, the fiber spray applicator 3 is equipped with a nozzle N arranged to deposit an essentially continuous sinuous strand St of the thermal-insulating composition in an omega pattern on the paper-based web P2, which may be continuously transported to the right as shown by the arrow. The pattern shape may be controlled by the pseudo-plasticity of the disclosed thermal-insulating composition. The pseudo-plasticity index of the thermal-insulating composition may be in a range of 0.3 to 0.5. In one embodiment, the pseudoplasticity index of the disclosed thermally insulating composition may be in a range of 0.4 to 0.45. A pseudoplastic fluid has the property that at low shear rates, the viscosity is relatively high and at high shear rates, the viscosity is relatively low. The pseudoplasticity index N is a measure of this deviation from shear rate-independent viscosity and may be calculated from the following equation:

$$T = K \times G^N$$

where K is a coefficient which is dependent on the material type, T is shear stress, and G is shear rate.

Materials which impart pseudoplasticity are known to one skilled in the arts. Examples of such materials are latex and low solids starch solutions; whereas, certain proteins make the formulation less pseudoplastic. Therefore, one skilled in the arts would recognize and may tailor the disclosed pseudo-plastic thermal-insulating composition such that it is deposited easily onto the paper-based substrate due to its high shear rate (for example, via its flow through a nozzle), and yet it is stable upon deposition because the compressive forces it experiences in a laminating machine are low shear-rate. Accordingly, the layer of thermal-insulating composition, once deposited onto the paper-based substrate, is dimensionally stable and may be passed through a laminating machine without undue compression. This arrangement could minimize material cost and ensure that voids are formed between the loops of bonding thermally insulating layer in the finished product. The thickness of the strand St may be set in a range of 0.05 mm to 5 mm.

Figure 2B:
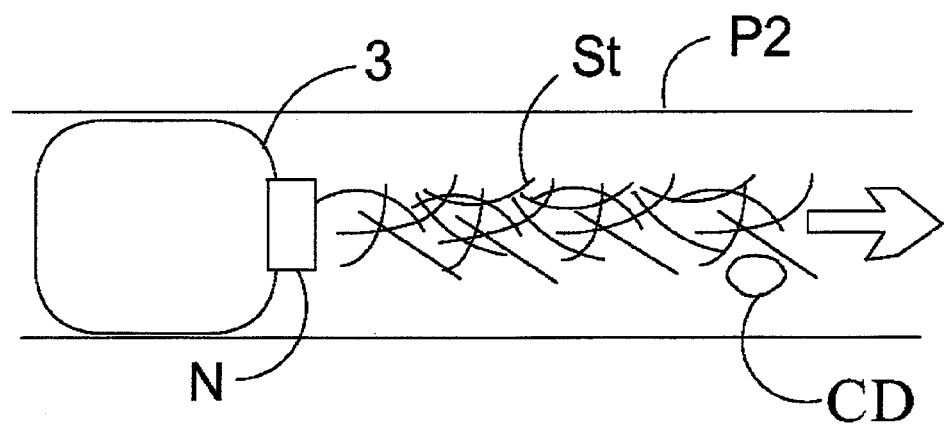
FIG. 2b shows one embodiment of the disclosed production process wherein the thermal-insulating composition is spray-applied onto the paper-based substrate in a random spray pattern.

FIG. 2b shows one embodiment of the disclosed process, wherein discontinuous strands St and coalesced droplets of the disclosed thermal-insulating composition may be deposited in a random pattern. This may be achieved by adjusting the discharge from the nozzles, the speed of the moving webs, as well as the pseudoplasticity, pressure and the surface tension of the thermal-insulating composition. In one embodiment, approximately 20% to 60% of the total surface of the paper-based substrate P2 may be covered with the thermal-insulating composition. The topograhy of the thermal-insulating layer may include some undulations, depending on the ingredient, rheology, and surface tension of the thermally insulating composition. In one embodiment, the thermal-insulating composition may have a surface tension in a range of 10 dyne/cm to 40 dyne/cm.

The disclosed packaging material has enhanced strength and stiffness, as well as improved thermal insulation. They are suitable for many packaging applications and may be formed in various packaging containers such as food or beverage containers. The disclosed packaging containers have enhanced strength, thermal insulation, and resistance to damage. Additionally, the disclosed packaging material and the packaging containers thereof have improved biodegradability.

The disclosed packaging material may be used for the formation of the double-walled thermal-insulating containers. The disclosed packaging material has a significantly improved flexibility that allows for its formation into the container shapes using the standard converting machinery, such as a standard paper cup-making machine.

When desired, the disclosed packaging material may be used as a sleeve for packaging containers to provide the thermal-insulating performance.

Figure 3:
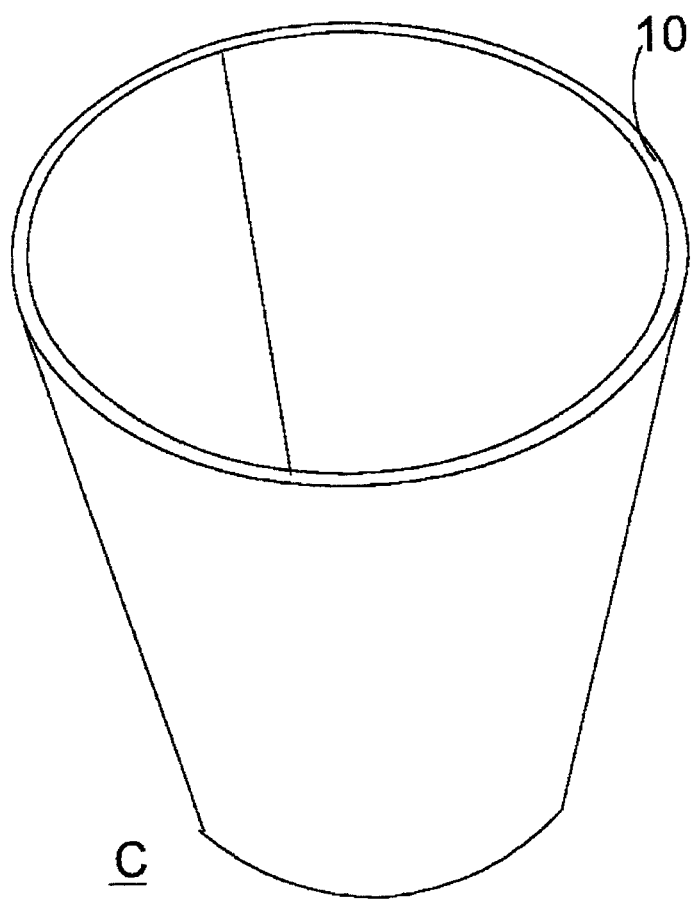
FIG. 3 shows one embodiment of the present disclosure wherein the thermal-insulating packaging material is used in the formation of cup.

In one embodiment of the present disclosure, the disclosed thermal-insulating material 10 is formed into a cup C as shown in FIG. 3, using standard cup making or sleeve-making apparatus.

In one embodiment of the disclosed process, the thermal-insulating composition may be deposited onto the paper-based substrate on a moving non-stick conveyor, without the paperboard feed systems as shown in FIG. 1. The produced thermal-insulating material may then be formed into the cup or sleeve using standard apparatus.

In one embodiment, the thermal-insulating layer S of the thermally insulating material may then be dried further to a moisture content below 10% to 15% weight to impart sufficient flexible, allowing the material to be processed in a cup making machine.

Figure 4:
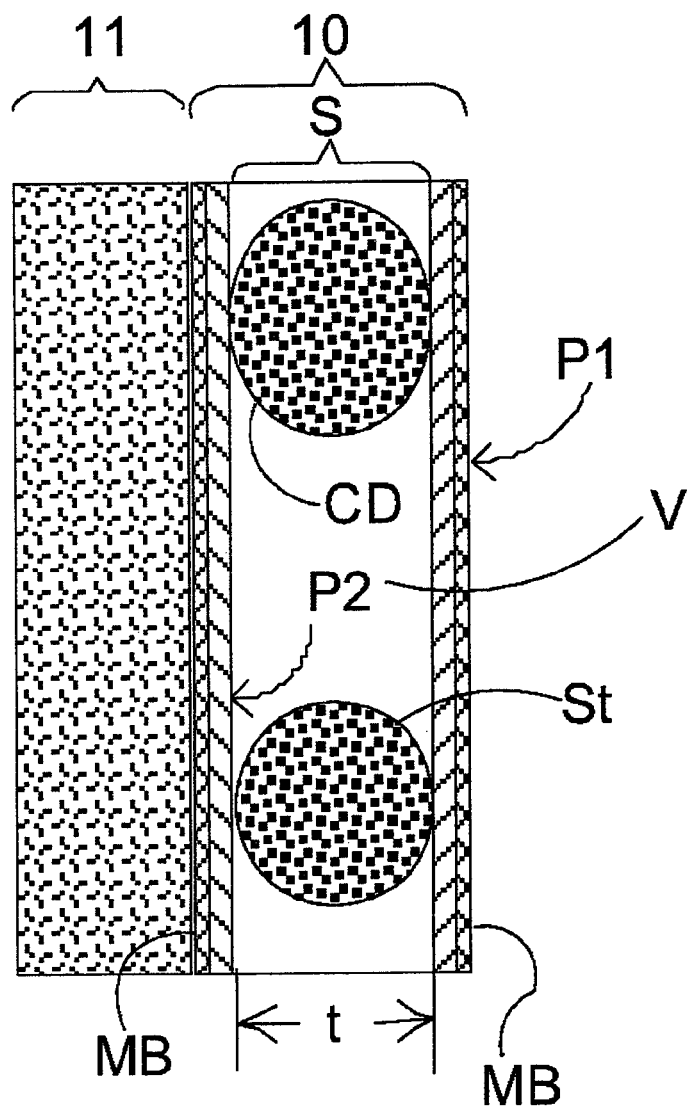
FIG. 4 shows one embodiment of the present disclosure wherein the disclosed thermal-insulating packaging material is used in the formation of sleeve for a container, demonstrating the cross-section of the container and the thermal-insulating sleeve.

In one embodiment of the present disclosure, the disclosed thermal-insulating packaging material may be used in the formation of sleeve for a container, and the cross-section of the container and the thermal-insulating sleeve is as shown in FIG. 4. The disclosed thermal-insulating material 10 may be produced from the process of FIG. 2b. The thermal-insulating material 10 comprises: the paper-based layers P1 and P2; the thermal-insulating layer t sandwiched between the two paper-based layers P1 and P2; and two moisture barrier layers MB, each MB layer being positioned on the other surface of the paper-based layers P1 and P2. The thermal-insulating layer t includes strands St and coalesced droplets CD of the thermally insulating composition, along with voids V. In FIG. 4, the disclosed thermal-insulating material 10 is used as a sleeve that wraps around a cup wall 11. Several known packaging materials may be used for the formation of the cup 11. Examples of these known packaging materials for cup formation include, but are not limited to, polystyrene foam, paper-based materials, plastic polymer, and combinations thereof. In one embodiment, the thickness of the thermal-insulating layer S may be in a range of 0.05 mm to 0.5 mm.

It is understood that from the present disclosure, one skilled in the arts may readily modify the production process; the compositions of the thermal-insulating layer; and the structure of the thermal-insulating packaging materials to facilitate the selected end-use applications. For example, the thermal-insulating composition may include the byproducts of corn, such as corn gluten feed, to impart a significant improvement of the strength and stiffness to the resulting thermal-insulating packaging material and the packages produced therefrom.

Although various aspects of the disclosed packaging materials with enhanced thermal-insulating performance have been shown and described, modifications may occur to those skilled in the art upon reading the specification. The present application includes such modifications and is limited only by the scope of the claims.

What is claimed is:

1. A thermo-insulating packaging material comprising:
   (A) a paper-based substrate layer;
   (B) a paper-based top layer; and
   (C) a thermal-insulating composition positioned between the paper-based substrate layer and the paper-based top layer, the thermal-insulating composition comprising a filler, an organic binder and a plasticizer.

2. The material of claim 1 further comprising a moisture barrier layer, and wherein the moisture barrier layer is positioned on at least one of the paper-based substrate layer and the paper-based top layer.

3. The material of claim 1 wherein the filler comprises, based on total weight of the filler:
   (i) inorganic filler in an amount of 0% to 90% by weight; and
   (ii) organic filler in an amount of 10% to 100% by weight.

4. The material of claim 1 wherein the thermal-insulating composition is positioned on at least one of the paper-based substrate layer and the paper-based top layer in a form of coalesced droplets, longitudinally-extending sinuous strands, or combinations thereof.

5. The material of claim 1 wherein the thermal-insulating composition comprises a starch binder.

6. The material of claim 1 wherein the thermal-insulating composition further comprises borax.

7. The material of claim 1 wherein the thermal-insulating composition comprises ungelatinized starch and sodium silicate.

8. The material of claim 1 wherein the thermal-insulating composition comprises corn fibers as the filler in an amount of 0.5% to 1% by weight based on total weight of the composition.

9. The material of claim 1 wherein the filler comprises insulating particles selected from the group consisting of ceramic air-containing particles, pearlite particles, and combinations thereof.

10. The material of claim 1 wherein the organic binder comprises a member selected from the group consisting of styrene-butadiene polymer, an acrylic-styrene butadiene polymer, starch, polyvinyl alcohol, polyvinyl acetate, and combinations thereof.

11. The material of claim 1 characterized by a thickness of the thermal-insulating composition in a range of 0.05 mm to 5 mm.

12. The material of claim 1 wherein the thermal-insulating composition is applied to at least one of said paper-based substrate layer and said paper-based top layer as a fluid, and wherein the fluid has a pseudoplasticity index in a range of 0.3 to 0.5.

13. The material of claim 1 wherein the thermal-insulating composition is applied to at least one of said paper-based substrate layer and said paper-based top layer as a fluid, and wherein the fluid has a low shear viscosity in a range of 2,000 to 50,000 cps, and a high shear viscosity in a range of 100 to 5,000 cps.

14. The material of claim 1 characterized by a porosity of the paper-based substrate layer in a range 20 to 150 Gurley units.

15. The material of claim 1 characterized by a porosity of the paper-based top layer in a range 20 to 150 Gurley units.

16. The material of claim 1 wherein the filler comprises at least 15 percent by weight of the thermal-insulating composition.

17. The material of claim 16 wherein the organic binder comprises 15% to 70% by weight of the thermal-insulating composition.

18. The material of claim 1 wherein the thermal-insulating composition comprises cellulosic solids as the filler in an amount of 2% to 50% by weight based on total weight of the composition.

19. The material of claim 18 wherein the cellulosic solids have an average particle size of at least 100 microns.

20. The material of claim 18 wherein the cellulosic solids include a member selected from the group consisting of cellulosic fibers, wood flour, wood dust, gluten feed, and combinations thereof.

* * * * *